Patented Aug. 15, 1939

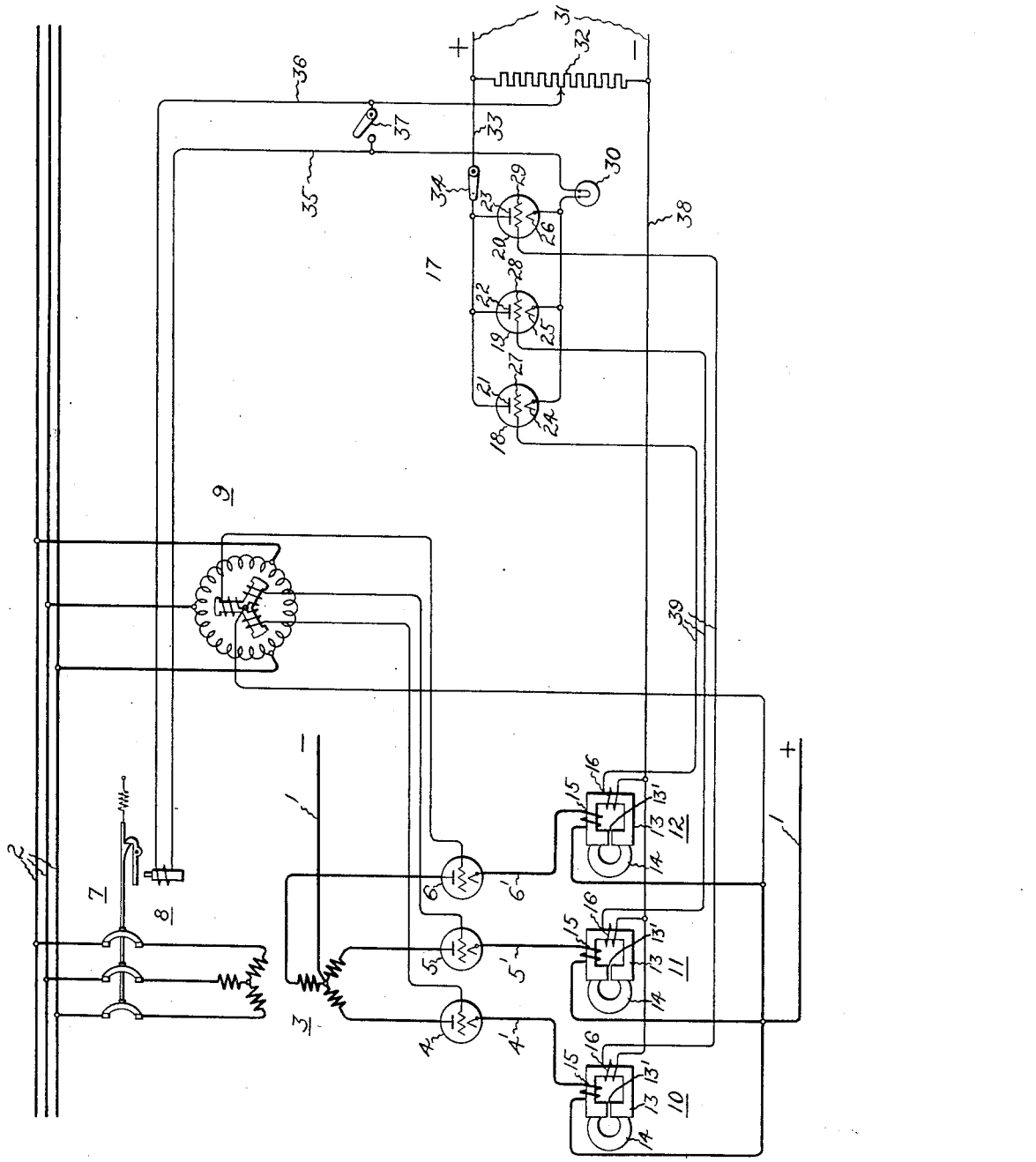

2,169,866

UNITED STATES PATENT OFFICE 2,169,866

ELECTRIC CONTROL AND INDICATING MEANS

Burnice D. Bedford, Schenectady, N. Y., assignor to General Electric Company, a corporation of New York Application January 30, 1936, Serial No. 61,529

2 Claims. (Cl. 171—119)

My invention relates to control and indicating means and more particularly to systems for controlling an electric circuit in response to electrical transients of short duration.

In electrical systems where it is desired to obtain an indication in response to an electrical quantity which reverses direction, it is highly desirable to provide apparatus of inexpensive construction which is susceptible of precise and reliable operation to indicate such reversal. Furthermore, there are applications where it is desirable to use apparatus having only relatively fixed elements which are entirely electrical in operation. There are also applications in which it is necessary to provide control or indication by the use of apparatus of rugged construction and which operates satisfactorily in response to electrical transients of short duration.

It is an object of my invention to provide an improved electroresponsive means which is entirely electrical in its operation for affording an indication or for controlling an electric circuit in response to a predetermined electrical condition.

It is another object of my invention to provide an improved control and indicating means for electric circuits which is entirely electrical in operation and which will respond to electrical transients of short duration.

It is a further object of my invention to provide an improved control and indicating system for electric valve circuits which will control the electric valves or afford an indication in response to a predetermined electrical condition.

In accordance with the illustrated embodiment of my invention, I provide a control and indicating means for an electric valve translating circuit which is responsive to an electrical condition or in response to predetermined variations in an electrical quantity of an associated circuit. The control and indicating circuit is energized from a suitable source by means of control electric valves and electroresponsive devices. The electroresponsive devices each comprises a magnetic core member in which there is established a unidirectional component of flux by means of a unidirectional magnetizing element such as a permanent magnet. A second magnetizing element, which is energized in response to an electrical quantity to be controlled, is also associated with the core member and establishes a second unidirectional variable component of flux in the core member but which does not appreciably alter the magnetization of the core member when the electrical quantity maintains a predetermined normal direction. When the electrical quantity reverses direction, the second magnetizing element changes or reverses the magnetization in the core member. Means, such as a winding, is inductively associated with the core member to control the conductivity of the control electric valves to effect a control of the main circuit or to afford an indication of the occurrence of the predetermined electrical condition.

For a better understanding of my invention, reference may be had to the following description taken in connection with the accompanying drawing, and its scope will be pointed out in the appended claims. The single figure of the accompanying drawing diagrammatically shows an embodiment of my invention as applied to an electric valve translating circuit for controlling the circuit or for affording an indication in response to a predetermined electrical condition of the translating circuit.

Referring now to the single figure of the drawing, a direct current load circuit 1 is energized from an alternating current circuit 2 through a transformer 3 and through electronic devices 4, 5, and 6, preferably of the gaseous type. A circuit interrupter 7 having an electromagnetic actuating element 8 may be provided to connect the transformer 3 to the alternating current circuit 2 and may be employed to control the energization of the electronic devices 4, 5, and 6, and hence control the energization of the load circuit 1. Any suitable means, such as the rotary phase shifting device 9, may be employed to control either manually or automatically the energization of the electronic devices 4, 5, and 6.

To provide a means for indicating an electrical condition of each of the electronic devices 4, 5, and 6, such as a reverse current condition, I provide electroresponsive devices 10, 11, and 12 having core members 13 with air-gaps 13', unidirectional magnetic biasing elements, such as permanent magnets 14, additional magnetizing elements 15, and windings 16. The poles of the various permanent magnets 14 are arranged to bridge the air-gaps 13' and establish unidirectional fluxes in the core members 13. When the current through the associated electronic devices 4, 5, and 6 and conductors 4', 5', and 6' is in a predetermined direction, the additional magnetizing elements 15 connected in series with electronic devices 4, 5, and 6 by means of conductors 4', 5', and 6', respectively, tend to establish additional unidirectional components of flux in the core members 13 which are in the same direction as the fluxes established by the permanent magnets 14. The windings 16 are dependent upon variations in the magnetic condition, such as changes or reversals in the magnetization of the core members 13, and each produces an electrical quantity variable in accordance with the component of flux produced by the additional magnetizing elements 15.

A control and indicating circuit 17 comprises electric valves 18, 19, and 20 of the gaseous type having anodes 21, 22, and 23, cathodes 24, 25, and 26, and control electrodes 27, 28, and 29, respectively, which control the energization of an indicating lamp 30 and the energization of the electromagnetic actuating element 8 of the circuit interrupter 7. The control and indicating circuit 17 is energized from a suitable direct current source 31 by means of a voltage divider comprising a resistance 32 which is connected across the direct current source 31. The anodes 21, 22, and 23 of electric valves 18, 19, and 20 are connected to the positive side of the direct current source 31 by means of a conductor 33 and a switch 34. The cathodes 24, 25, and 26 are connected through the indicating lamp 30, conductor 35, the electro-mechanical actuating element 8, conductor 36, to a suitable point of relatively negative potential on the resistance 32. A switch 37 is connected in shunt relation to the electromagnetic actuating element 8 of circuit interrupter 7 for short circuiting this element when it is desired to obtain only an indication of the arc-back condition or when it is undesirable or inexpedient to control the energization of the electric valve translating circuit in response to an arc-back condition.

During normal operation, that is, when the electronic devices 4, 5, and 6 are conducting current in the proper direction, the control electric valves 18, 19, and 20 of the control and indicating circuit 17 are maintained non-conductive by impressing a negative potential from direct current source 31 and the resistance 32 upon the associated control electrodes 27, 28, and 29 by means of a conductor 38, the windings 16 of the electroresponsive elements 10, 11, and 12 and conductors 39.

Although my invention has been diagrammatically shown as applied to an electric valve translating circuit, it will be apparent that my invention in its broader aspects may be applied to electric circuits generally where it is desired to obtain an indication of an electrical condition of an associated electric circuit.

The operation of the embodiment of my invention diagrammatically illustrated in the single figure of the drawing may be best explained by considering the operation of the translating circuit when unidirectional current is being supplied to the direct current circuit 1 from the alternating current circuit 2. The electronic devices 4, 5, and 6 will be rendered conductive in a predetermined sequence to supply this unidirectional current to the load circuit 1 in the manner well understood by those skilled in the art. During normal operation, that is, when each of the electric valves is conducting current in the normal direction, the additional magnetizing elements 15 associated with each of the electroresponsive elements 10, 11, and 12 will impress upon core members 13 a magnetomotive force which will tend to establish a unidirectional component of flux in the core member 10 having the same direction as the component of flux established by the associated permanent magnet 14. When the current transfer is in the normal direction, the effect of the additional magnetizing elements 15 will be to increase slightly the magnetization of the core member 13. Since the component of flux established by the permanent magnet 14 effects substantial saturation of the core member 13, the change in magnetization due to the magnetizing element 15 will not be appreciable and hence there will be practically no voltage induced in the windings 16 due to this change in magnetization.

During normal operation of the electric valve translating circuit electric valves 18, 19, and 20 of the control and indicating circuit 17 will be maintained non-conductive by virtue of the negative potential impressed upon the associated control electrodes 27, 28, and 29. If it be assumed that one of the electronic devices, for example, electronic device 4, conducts current in the reverse direction due to an arc-back condition, the current flowing through the additional magnetizing element 15 of the electroresponsive device 10 will impress a magnetomotive force on the core member 13 to tend to establish in the core member 13 a flux which is in the opposite direction to that established by the permanent magnet 14. This change in magnetization, which may be either a reduction in the magnetization or a reversal of magnetization of the core member 13, will induce a voltage in the winding 16 to impress a suitable voltage upon the control electrode 27 of electric valve 18 to render valve 18 conductive. Current, therefore, will be conducted from the positive terminal of the direct current source 31 through conductor 33 and switch 34, through electric valve 18, indicating lamp 30, conductor 35, electromagnetic actuating element 8, conductor 36, to the resistance 32. Since electric valve 18 is of the gaseous type, it will be maintained conductive as long as the potential impressed across the anode and the cathode is greater than the critical potential for the particular valve used. The circuit interrupter 7 will be actuated to the open circuit position, effecting thereby de-energization of the electric valve translating circuit and an indication will be afforded by means of the lamp 30 that a reverse current condition has existed in one of the electronic devices 4, 5, and 6. Since the electric valve 18 is associated with the electronic device 4 through the electroresponsive element 10, an indication will also be afforded that the electronic device 4 was the electronic device to experience the arc-back condition. To reset the control and indicating circuit 17, the switch 34 may be moved to the open circuit position to effect de-energization of the electric valve 18. This operation will afford an opportunity for the control electrode 27 to regain control of the electric valve 18, and by virtue of the negative potential impressed upon the control electrodes the electric valves will be maintained nonconductive.

The control and indicating circuit 17 will also function to indicate the first device of the electronic devices 4, 5, and 6 to experience an arc-back condition. Since these electric valves are of the gaseous type, after one of them is rendered conductive, the voltage impressed upon the other valves will be relatively small and may be less than the voltage required to render the other valves conductive. In this manner, only the valve associated with the first circuit to experience a reverse current condition will be rendered conductive.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric conductor, and an electroresponsive device operative in accordance with the current transmitted by said conductor comprising a core member having an air gap, a permanent magnet biasing member bridging said air gap for effecting substantial saturation of said core member, a magnetizing member responsive to the current of said conductor for magnetizing said core member in the same direction as said permanent magnet biasing member when the current is in a predetermined direction and a winding responsive to a magnetic condition of said core member for providing a voltage when the current reverses direction.

2. An electro-responsive device comprising a magnetic core member having an air gap, means for establishing a unidirectional component of flux substantially constant in value in said core member to effect substantial saturation thereof including a permanent magnet arranged to bridge said air gap, means for establishing a second normally unidirectional variable component of flux in said member in the same direction as said unidirectional component of flux, and a winding associated with said core member for producing an electrical quantity when said second component of flux reverses direction.

BURNICE D. BEDFORD.